United States Patent
Gamboa et al.

(10) Patent No.: US 7,960,943 B2
(45) Date of Patent: Jun. 14, 2011

(54) MODULAR BATTERY SYSTEM HAVING BATTERY MONITORING AND DATA COLLECTION CAPABILITY

(75) Inventors: Paul Gamboa, Chicago, IL (US); John J. C. Kopera, Vail, AZ (US); Christopher Matthew Millon, Grand Blanc, MI (US)

(73) Assignee: Cobasys, LLC, Orion, MI (US)

( * ) Notice: Subject to any disclaimer, the term of this patent is extended or adjusted under 35 U.S.C. 154(b) by 336 days.

(21) Appl. No.: 11/601,172

(22) Filed: Nov. 17, 2006

(65) Prior Publication Data

US 2008/0118819 A1 May 22, 2008

(51) Int. Cl.
*H02J 7/00* (2006.01)

(52) U.S. Cl. ........ 320/107; 320/116; 320/126; 429/161; 429/163

(58) Field of Classification Search .............. 320/107, 320/116, 117, 126, 134, 136, 118, 119, 120, 320/122, 124, 125, 127
See application file for complete search history.

(56) References Cited

U.S. PATENT DOCUMENTS

| | | | | |
|---|---|---|---|---|
| 5,642,030 A * | 6/1997 | Seelye | | 320/101 |
| 5,789,900 A * | 8/1998 | Hasegawa et al. | | 320/132 |
| 5,886,501 A * | 3/1999 | Marks et al. | | 320/112 |
| 6,121,765 A * | 9/2000 | Carlson | | 323/359 |
| 6,275,003 B1 * | 8/2001 | Marukawa et al. | | 320/116 |
| 6,896,995 B2 * | 5/2005 | Saito | | 429/163 |
| 2003/0118898 A1 * | 6/2003 | Kimura et al. | | 429/156 |
| 2003/0222618 A1 * | 12/2003 | Kanouda et al. | | 320/116 |
| 2004/0212342 A1 * | 10/2004 | Batson | | 320/107 |
| 2005/0079408 A1 * | 4/2005 | Hirano | | 429/82 |
| 2005/0206342 A1 * | 9/2005 | Aleyraz et al. | | 320/101 |
| 2005/0242776 A1 * | 11/2005 | Emori et al. | | 320/116 |
| 2005/0250006 A1 * | 11/2005 | Kim | | 429/160 |
| 2005/0285567 A1 * | 12/2005 | Kim | | 320/116 |
| 2006/0152224 A1 * | 7/2006 | Kim et al. | | 324/430 |
| 2006/0273762 A1 * | 12/2006 | Yamaji et al. | | 320/132 |
| 2007/0052390 A1 * | 3/2007 | Kim et al. | | 320/116 |
| 2009/0104516 A1 * | 4/2009 | Yoshihara et al. | | 429/149 |

* cited by examiner

*Primary Examiner* — Edward Tso
*Assistant Examiner* — Arun Williams
(74) *Attorney, Agent, or Firm* — Anthony J. Serventi (57) ABSTRACT

Disclosed herein is a modular battery system having at least one subsystem comprising a plurality of battery modules connected in series or parallel, wherein each subsystem preferably having a first endplate and a second endplate. The battery modules may be bound between the first and second endplates. A plurality of band members couple the first and second endplates to each other and bind the battery module between the endplates. Further, a data collection panel is in electrical communication with each of the battery modules and the data collection panel transmits status information of the modules to a master control module, which converts the electrical into a data transmission through a controller area network (CAN) bus. Status information may include module temperature, module pressure and module voltage, essentially any measurable parameter that may be conducted via an electrical signal. Depending on the needs of a given application, the battery modules may be connected in series or parallel.

24 Claims, 7 Drawing Sheets

MODULAR BATTERY SYSTEM HAVING BATTERY MONITORING AND DATA COLLECTION CAPABILITY

FIELD OF THE INVENTION

The present invention relates to a modular battery system. More particularly, the present invention relates to a modular battery system having a plurality of battery modules, a data collection panel and a bundling means for stabilizing the battery modules within the modular battery system of the present invention, the modular battery systems adapted to be stackable to meet power needs.

BACKGROUND OF THE INVENTION

Rechargeable nickel-metal hydride (NiMH) batteries are used in a variety of industrial and commercial applications such as fork lifts, golf carts, uninterruptible power supplies, pure electric vehicles and hybrid electric vehicles. Vehicular applications include applications related to propulsion as well as applications related to starting, lighting and ignition.

One aspect of battery operation that is particularly important for electric vehicle and hybrid vehicle applications is that of thermal management. In both electric and hybrid vehicle applications individual electrochemical cells are bundled together in close proximity. Many cells are both electrically and thermally coupled together. Therefore, the nickel-metal hydride batteries used in these applications may generate significant heat during operation. Sources of heat are primarily threefold. First, ambient heat due to the operation of the vehicle in hot climates and second, resistive or $I^2R$ heating on charge and discharge, where I represents the current flowing into or out of the battery and R is the resistance of the battery. Third, a tremendous amount of heat is generated during overcharge due to gas recombination.

A battery generates Joule's heat and reaction heat due to electrode reaction at charging and discharging operations. A module battery including a series of cells having such a large capacity or a pack battery including a series of the module batteries is configured of several tens to several hundreds of the cells arranged contiguously to each other. The cells, with an increased electric capacity and sealed configuration, increase in the amount of heat accumulation, with the result that heat dissipation out of the battery is retarded and the generated heat is accumulated within the battery. Consequently, the internal temperature of such a battery rises by a degree more than that of a smaller battery. U.S. Pat. No. 5,879,831 hereinafter "831 Patent") discloses battery module having a plurality of individual batteries secured by bundling/compression means welded at the corners to restrict the batteries from moving or dislodging when subjected to mechanical vibrations of transport or use. U.S. Pat. No. 5,663,008 (hereinafter "008 Patent") discloses a module battery having a plurality of cells secured between two ends plates and band-like binding members for coupling the endplates. The primary purpose of the design disclosed is to prevent deformation of the synthetic resin battery casing.

While issues regarding heat dissipation are generally common to all electrical battery systems, they are particularly important to nickel-metal hydride battery systems. This is because NiMH has a high specific energy and the charge and discharge currents are also high. Second, because NiMH has an exceptional energy density (i.e. the energy is stored very compactly) heat dissipation is more difficult than, for example, lead-acid batteries. This is because the surface-area to volume ratio is much smaller than lead-acid, which means that while the heat being generated is much greater for NiMH batteries than for lead acid, the heat dissipation surface is reduced.

In addition, while the heat generated during charging and discharging NiMH batteries is normally not a problem in small consumer batteries however, larger batteries (particularly when more than one is used in series or in parallel) generate sufficient heat on charging and discharging to affect the ultimate performance of the battery.

Thermal management issues for nickel-metal hydride batteries are addressed in U.S. Pat. Nos. 6,255,015, 6,864,013 and U.S. patent application Ser. No. 10/848,277 are all of which are hereby incorporated herein by reference.

An example of a monoblock battery is provided in U.S. Pat. No. 5,356,735 to Meadows et al, which is incorporated by reference herein. Another example is provided in U.S. Pat. No. 6,255,015 to Corrigan et al, which is hereby incorporated by reference herein.

Currently there exists a need in the art for a modular battery system that provides stability for individual modules and thermal management of the system to reduce, among other things, overheating of the system, deformation of the casings and shock to the system. Further, there exists a need in the art for a modular battery system that utilizes a battery management system to monitor the performance and status information of each battery module in the modular battery system and which has flexibility for a wide variety of applications.

SUMMARY OF THE INVENTION

Disclosed herein is a modular battery system having at least one subsystem comprising a plurality of battery modules connected in series or parallel, wherein each subsystem preferably having a first endplate and a second endplate. The battery modules may be bound between the first and second endplates. A plurality of band members couple the first and second endplates to each other and bind the battery module between the endplates. Further, a data collection panel is in electrical communication with each of the battery modules and the data collection panel transmits status information of the modules to a master control module, which converts the electrical into a data transmission through a controller area network (CAN) bus. Status information may include module temperature, module pressure and module voltage, essentially any measurable parameter that may be conducted via an electrical signal. Depending on the needs of a given application, the battery modules may be connected in series or parallel. In applications that require more voltage, the battery modules may be connected in series, whereas in applications that require more power the battery modules may be connected in parallel.

The subsystems are secured into a system housing, wherein the system housing comprises a face plate, a back plate, a cover, a bottom, a first side panel and a second side panel. Preferably, the data collection panel comprises at least one interconnect plate, wherein each interconnect plate is in electrical communication with the subsystems. Individual traces, i.e. signal lines, run through each interconnect plate connected to a module via the electrical communication module terminal connectors, wherein each trace is adapted to carry an electrical signal associated with one parameter to be measured or monitored. Also, the interconnect plates transfers electrical current from the battery modules to a positive terminal and from a negative terminal. A mid interconnect plate transmits status information of the modules to the master control module. At least one temperature sensor may be integrated into each of the interconnect plates sense temperature for transmission through the interconnect plate and mid interconnect plate to the master control module.

The master control module may be a microprocessor PC board in electrical communication with the mid interconnect plate. The master control module is the primary control and monitoring mechanism of the modular battery system, including control of each module's charge cycle and collection of the status information. Further, a controller area network bus communication connector is in electrical communication with the master control module, wherein the controller area network bus communication connector is adapted to relay the status information and load software parameters into the master control module.

Disclosed herein is a stationary battery system having a plurality of modular battery systems. The stationary system may be adapted to fit a wide variety of applications based upon the desired back up power required. Each modular battery system comprises at least one subsystem comprising a plurality of battery modules electrically connected, wherein each subsystem is equipped with a first endplate and a second endplate with the battery modules bound between the first and second endplates. A plurality of band members may couple the first and second endplates to each other and bind the battery module between the endplates. The system may further include a data collection panel in electrical communication with each of the battery modules, wherein the data collection panel transmits status information, such as module voltage and module temperature, to a master control module. Each master control module is preferably connected to a master data monitoring unit via the controller area network bus communication connector. The master data monitoring unit may provide status information for each module and modular battery system in the stationary battery system.

Depending on the needs of a given application, the modular battery systems may be connected in series or parallel. In applications that require more voltage, the modular battery systems may be connected in series, whereas in applications that require more power the modular battery systems may be connected in parallel.

The stationary battery system may be stacked in an enclosed rack. The enclosed rack may comprise an enclosed cabinet. The stationary battery system may be stacked in an open relay rack. The open rack may comprise a set a vertically set parallel support posts, wherein each modular battery system is secured between the parallel posts.

BRIEF DESCRIPTION OF THE DRAWINGS

In order to assist in the understanding of the various aspects of the present invention and various embodiments thereof, reference is now made to the appended drawings, in which like reference numerals refer to like elements. The drawings are exemplary only, and should not be construed as limiting the invention.

DETAILED DESCRIPTION OF EMBODIMENTS OF THE INVENTION

The modular battery system of the instant invention includes: 1) a plurality of individual battery modules having a plurality of individual batteries; 2) a data collection panel connecting the individual batteries of the module to one another and providing means for electrically interconnecting the separate battery modules to one another; and 3) a battery module bundling/compression means. Preferably, the modular battery system contains integral electronic controls to measure the voltage and the temperature of each module. The status information, such as voltage and temperature, may be reported to a master data monitoring unit over a Controller Area Network (CAN) bus connected to the master control module. The integral controller may also indicate the unit status by actuating the status LEDs on the front panel.

Figure 1:
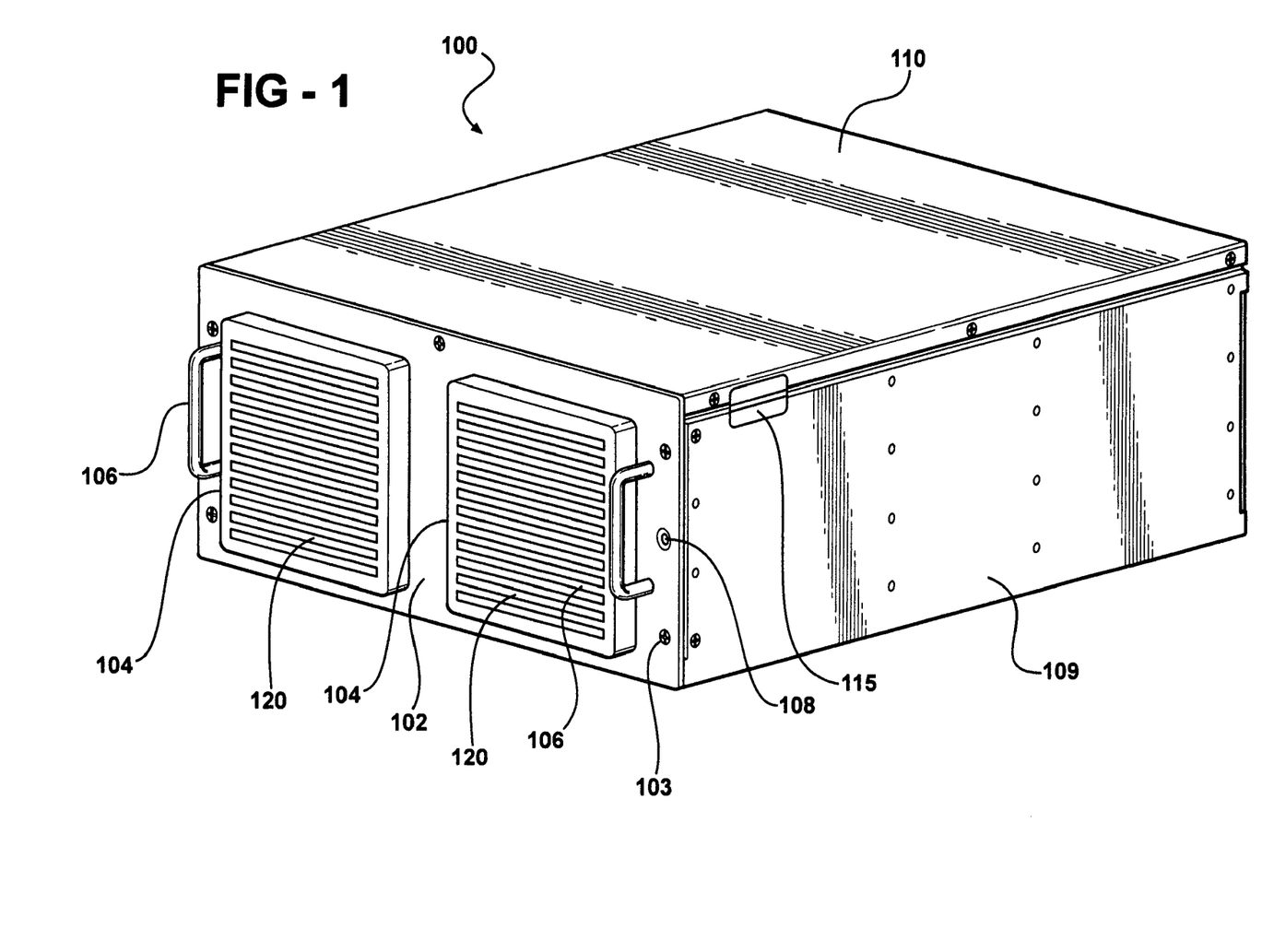
FIG. 1 is a perspective view of an embodiment of the present invention that shows an embodiment of the front side of the outer casing.
Figure 2A:
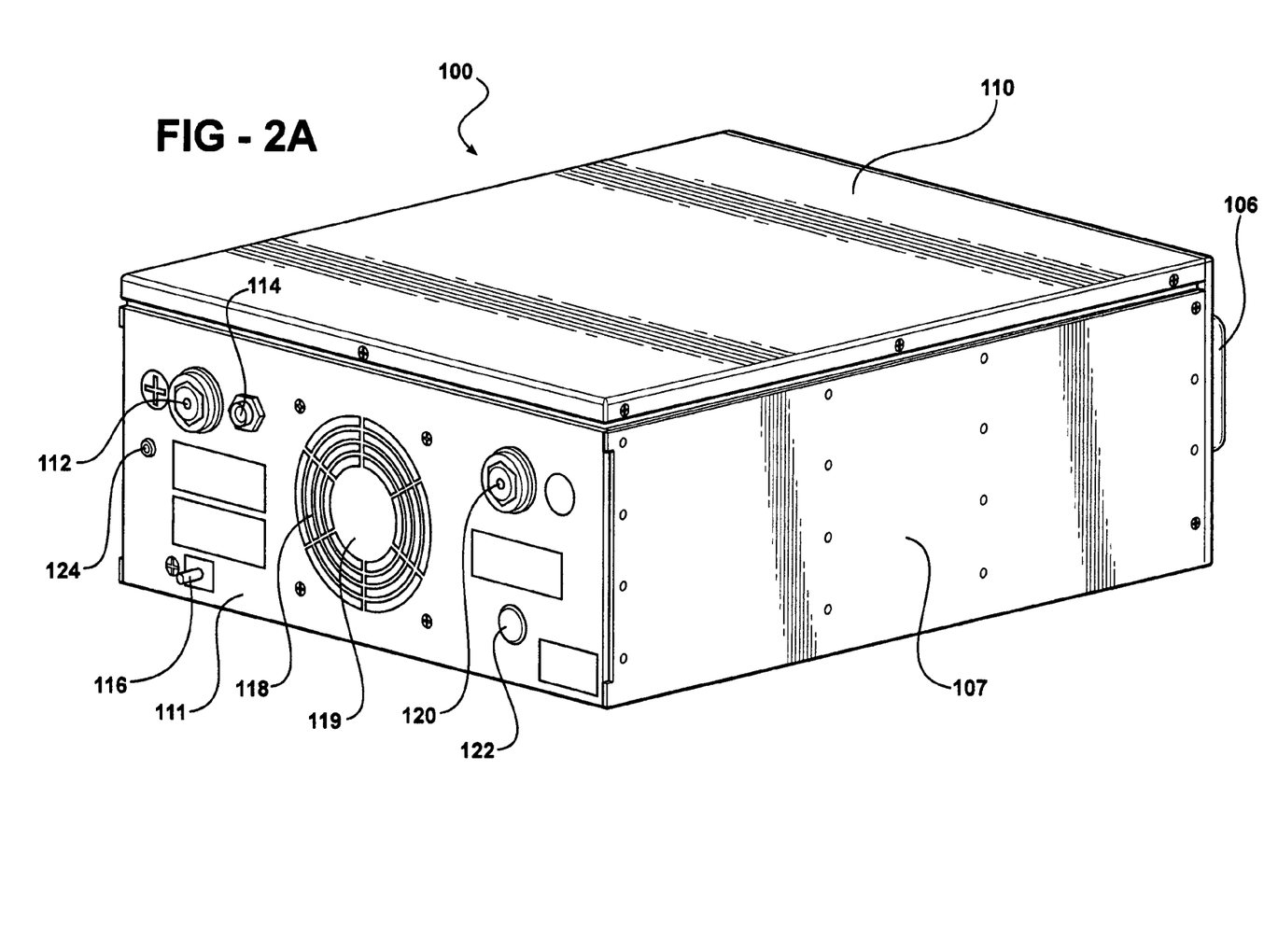
FIG. 2A is a perspective view of an embodiment of the present invention that shows an embodiment of the rear side of the outer casing.
Figure 2B:
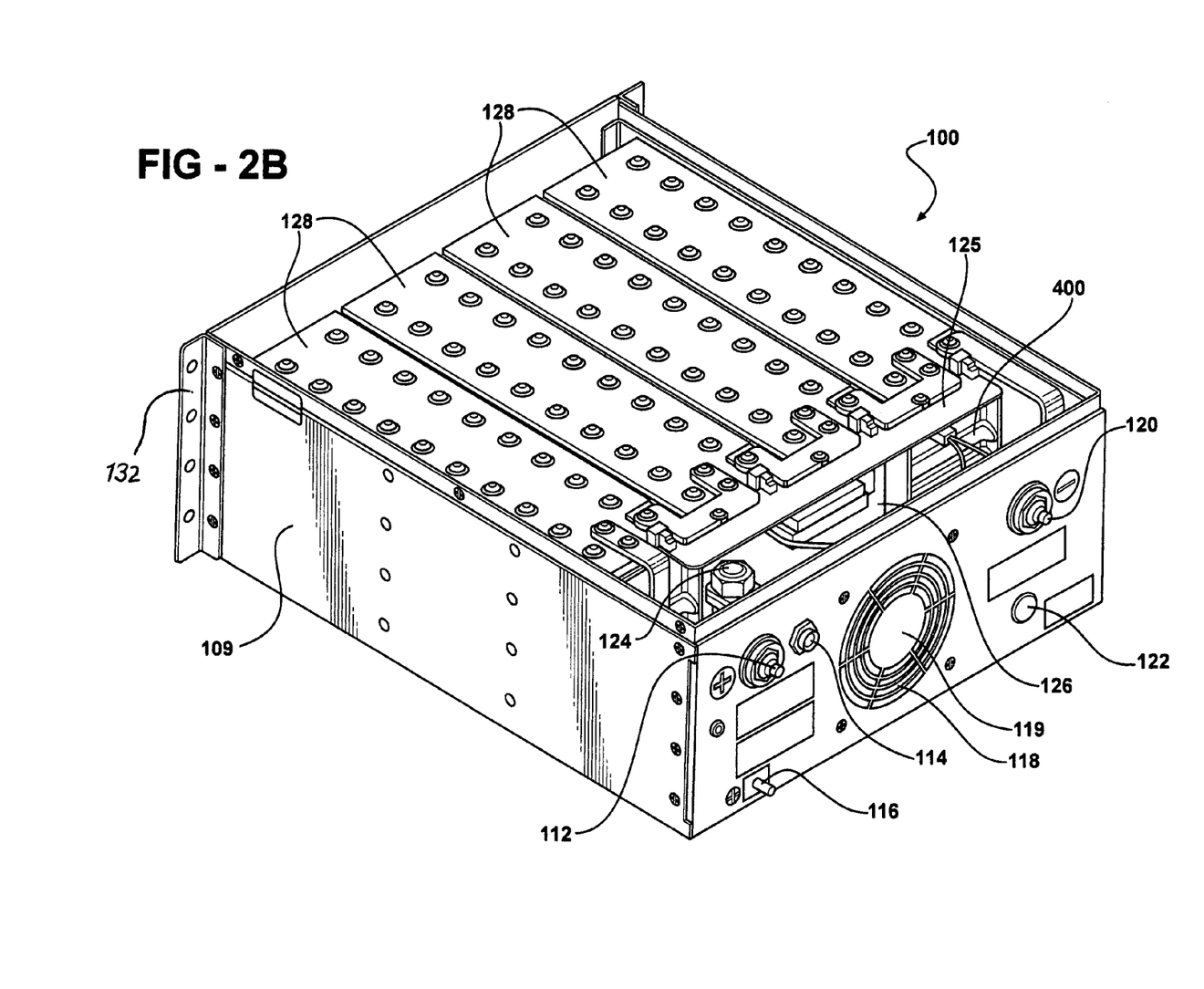
FIG. 2B is a perspective view of an embodiment of the present invention that shows an embodiment of the rear side of the outer casing and the cover removed.
Figure 3:
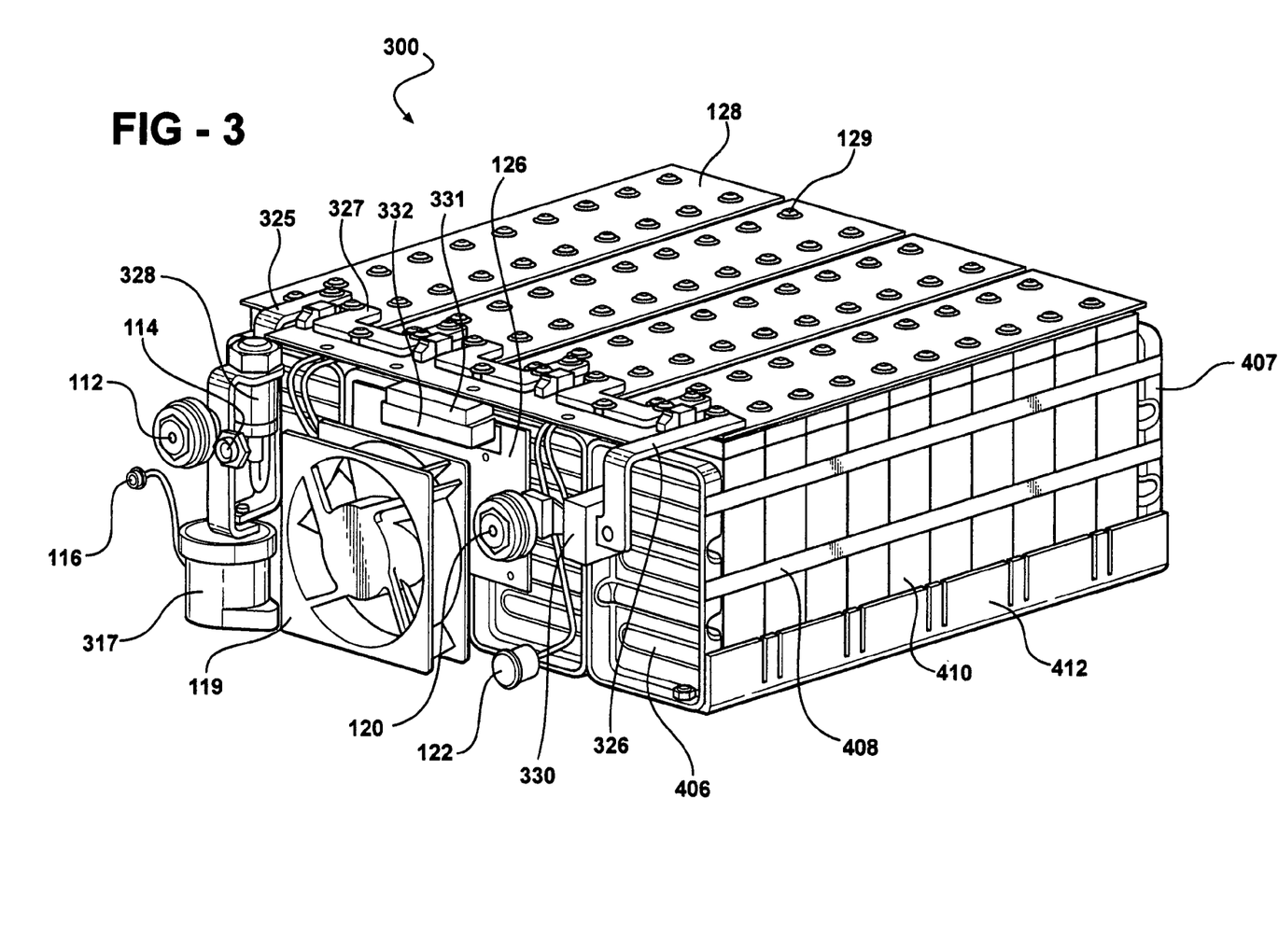
FIG. 3 is an a perspective view of an embodiment of the present invention that shows an embodiment with the cover, side panels, back plate and front plate removed wherein the individual battery modules are equipped with a data collection system.

The modular battery system 100 is preferably secured into a system housing. Preferably, the system housing comprises a cover 110, a bottom, a back plate 111, a face plate 102, a first side panel 109 and a second side panel 107, as illustrated in FIGS. 1-3. Preferably, the height of the battery system housing is in "Rack Units" or U, an Electronic Industries Alliance or more commonly "EIA" standard measuring unit for computer rack mount type equipment. A "Rack Unit" is equal to 1.75 inches in height. Preferably, each modular battery system enclosure is designed to fit into a standard EIA size rack enclosures. Exemplary rack designs for a plurality of modular battery systems to form a stationary battery system is described in more detail below.

The construction material of the system housing is preferably a rigid material such as steel or other conductive metal. However, the system housing may be constructed of other materials, such as a polypropylene/polystyrene blend with glass fibers or other plastic material.

Figure 6:
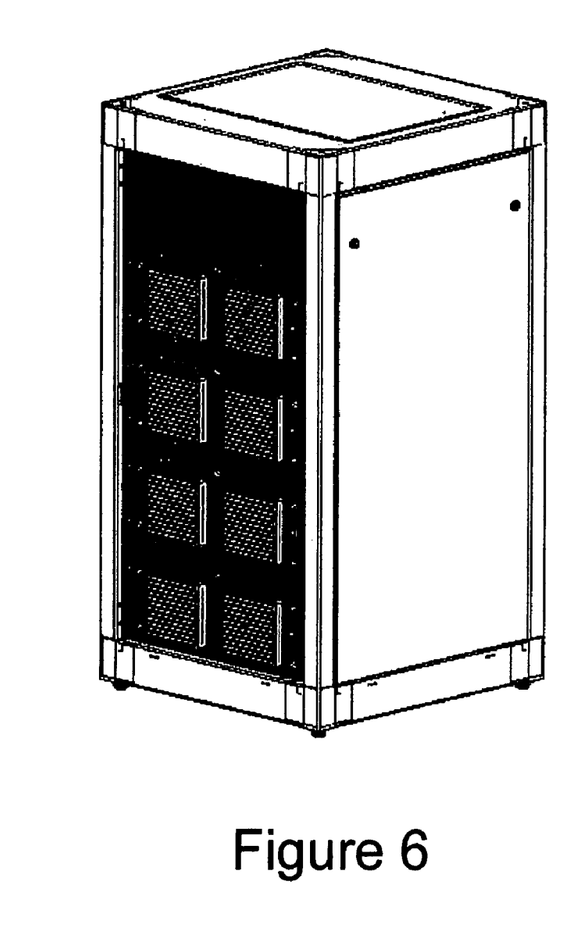
FIG. 6 is a perspective view of an embodiment of the present invention that shows an embodiment of an enclosed rack.

Referring to FIGS. 1 and 2B, the modular battery system of the present invention, generally referred to as 100, is shown having the face plate 102, the first side panel 109 and the cover 110. Preferably, the face plate 102 has handles 106 attached thereto for ease of handling when inserting or removing the system 100 into or out of a frame, as described below. Preferably, at least one air grate 104 is integrated into the face plate 102. Each air grate 104 allows air filter 120 to be inserted into or removed from the face plate 102. Air flows through the air grate 104 to provide air cooling of the modules of the system 100. The air filter 120 inhibits the transfer of dirt and other particles which may affect the performance of the various components of the system 100, such as the modules and the supporting electronic. The air filter 120 is preferably any common air filter material such as carbon fiber. To display the operation status of the system, a front LED 108 may be integrated into the face plate 102. The face plate may be secured to the side panels using screws 103; however any securing mechanism may be incorporated. For security a security label 115 set onto the cover 110 and first side panel 109. If the cover 110 is removed or detached from the first side panel 109, the security label 115 is breached or torn. A side panel bracket 132 may be secured to each of the side panels 107 and 109. The side panel bracket 132 may then be secured to a rack as shown in FIG. 6.

Referring to FIG. 2, the system 100 is shown having a back plate 111, a second side panel 107 and the cover 110. A positive terminal 112 and negative terminal 120 is preferably integrated into the back plate 111.

Preferably, the system of the present invention contains integral electronic controls to measure and monitor at least the voltage and the temperature of each module. This data is reported to a master data monitoring unit over a controller area network (CAN) bus 114 via the master control module 126. The CAN bus 114 is a serial communication connector for monitoring battery status and loading software and parameters. The CAN bus 114 also indicates the unit status by actuating the status LEDs 108 on the front panel, in the event a programmed parameter is exceeded. The electrical signals are transmitted from the battery modules 400, through the interconnect plate 128 and mid interconnect plate 125 to master control module 126, which converts the electrical signals into data signals for transmission through the CAN bus 114. The master control module 126 is preferably a microprocessor PC board. Each measurable parameter is transmitted as an electrical signal through a trace (not shown) embedded in the interconnect plate 128.

The electronics power switch 122 controls the electricity flowing to and from the electronics. The ground stud 116 provides grounding for the battery enclosure, which includes the face plate, first panel, second panel, back plate cover and bottom. A fan 118 is preferably integrated into the back plate 110 to draw cooling air through the air filters 120 in the face plate 102, by the modules 400 and other interior component and out through the fan frame 119. The air cooling draws heat away from the modules 400 and other system components during cycling. If any of the battery module temperatures within the unit exceed programmed limits or if the charging or discharging currents exceed certain set points, the master control module 126 actuates the fan 118 to ensure the battery modules 400 are kept within their specified temperature range.

To display the operation status of the system, a LED 108 may be integrated into the face plate 102. The LED 108 may is triggered to light when a dangerous parameter is exceeded. For example, if temperature of the system rises beyond an acceptable predetermined level the master control module will trigger the LED 108 to light.

Referring to FIGS. 2B and 3, a data collection panel preferably comprises at least one interconnect plate 128, wherein each interconnect plate 128 is in electrical communication with a battery module subsystem 400. One function of the interconnect plate 128 is to transfer electrical current to the battery modules from the positive terminal 112 and from the battery modules to the negative terminal 120. Another function of the interconnect plate 128 is to transmit status information, such as battery temperature and battery voltage, through traces from the battery modules to a mid interconnect plate 125. In a preferred embodiment, at least one temperature sensor is integrated into each interconnect plate 128 to detect the temperature of the battery modules. The interconnect plate 128 may be design to transmit any status information which a user desires to collect regarding the battery modules, the subsystems and the surrounding area. For example, hydrogen sensors or moisture sensors may be integrated into the interconnect plate 128, which may be in turn transmit the information to a mid interconnect plate 125. The mid interconnect plate 125 transmits the electrical signals received from the interconnect plate 128 to the master control module 126 which converts the electrical signals into data signals. The mid interconnect plate 125 may be connected to the master control module 126 via signal transmission connectors 331 and 332.

Preferably, each module terminal is in electrical communication with a module terminal connector 129 of the adjoining interconnect plate 128. The module terminal connectors 129 transmit electrical current from the battery modules to the interconnect plate 128, where the electrical current is further transmitted to the positive terminal 112. Further, each module terminal connector 129 transmits status information to the interconnect plate 128. Individual traces, i.e. signal lines, run through each interconnect plate 128 connected to a module 410 via the module terminal connectors 129, wherein each trace is adapted to carry an electrical signal associated with one parameter to be measured or monitored. In a preferred embodiment, at least one temperature sensor is integrated into each interconnect plate 128 to detect the temperature of the battery modules. The interconnect plate 128 may be design to transmit any status information which a user desires to collect regarding the battery modules, the subsystems and the surrounding area. For example, hydrogen sensors or moisture sensors may be integrated into the interconnect plate 128, which may be in turn transmit the information to a mid interconnect plate 125.

Figure 4:
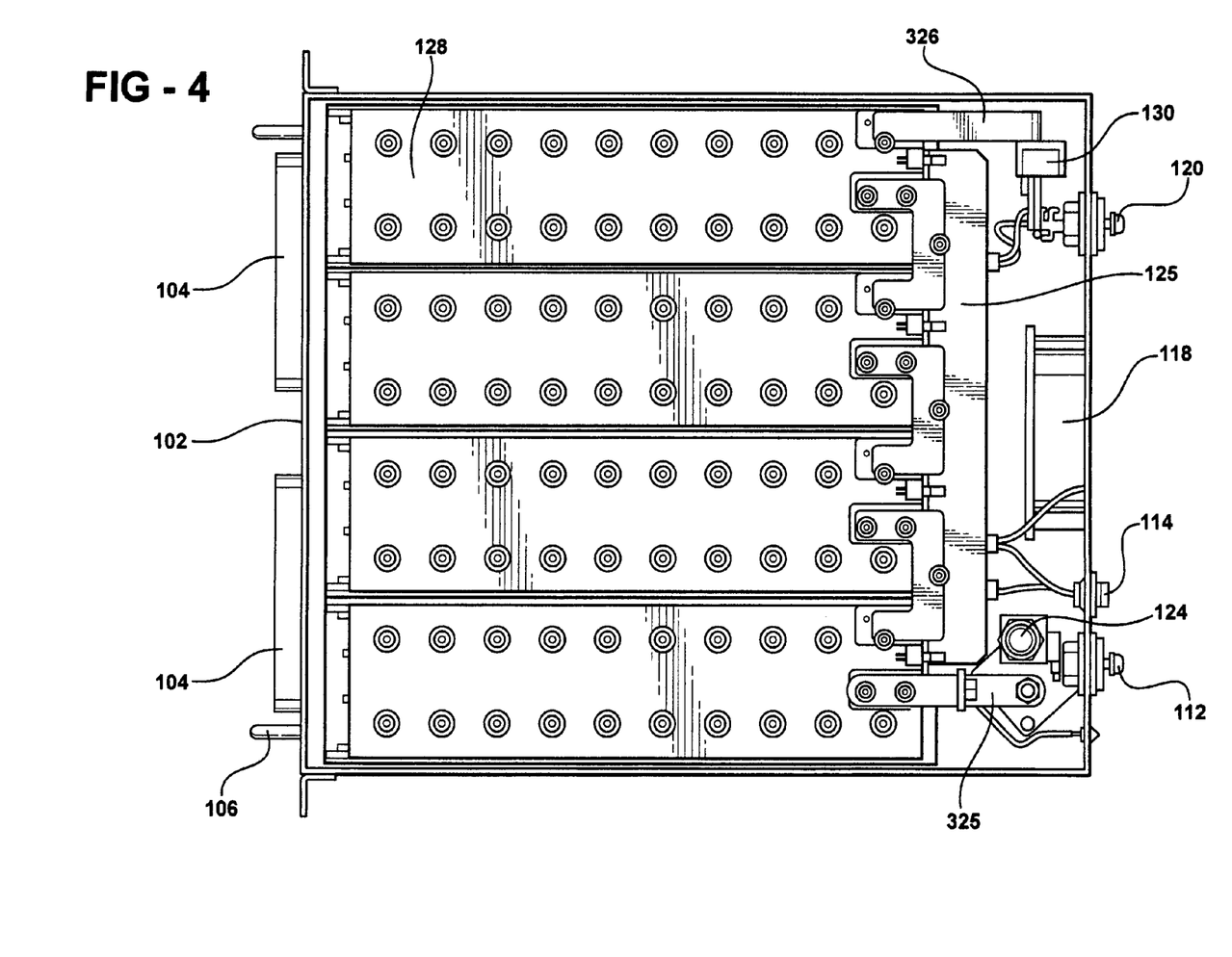
FIG. 4 is a top view of an embodiment of the present invention with the cover removed that shows an embodiment of a battery module having a current sensor and mid interconnect plate.

The master control module 126 controls the charge cycle of the battery modules and collects said status information, as described above, but the master control module 126 also controls the LEDs 124, actuation of the fan 118 and any other control or monitoring function that may be programmed by a user as will be described throughout this specification. For example, an integral temperature sensor in data communication with the master control module 126 when the temperature within the system increases above an acceptable predetermined level the integral temperature sensor sends a signal to the master control module 126. In response, the master control module 126 actuates the fan to promote air cooling in the system and the master control module 126 communicates with the relay 317, which closes to reduce the amount of current and to reduce the cycling of the modules which reduces the production of heat by the modules. A current sensor 330 may be incorporated to sense current flow into and out of modular battery system and is controlled and monitored by master control module 126.

Bus bars 325, 326 and 327 conduct electrical current through the modular battery system 300. A negative terminal bus bar 326 is in electrical communication between a first subsystem and the main negative terminal 120 via the current sensor 330. A positive terminal bus bar 325 is in electrical communication between a last subsystem and the main positive terminal 112. Module bus bars 327 conduct electrical current between modules. The bus bars are preferably constructed of copper.

The master control module 126 is the primary control and monitoring mechanism of the modular battery system 100. Preferably, the master control module 126 is in data communication with controller area network bus 114 to relay the information from the modular battery system 100 to the user. A controller area network bus communication connector 114 in data communication with said master control module 126, said controller area network bus communication connector 114 adapted to transmit the status information and load software parameters into the master control module 126.

The modular battery system 100 may further include a diode 124 in electrical communication between an interconnect plate 128 and the positive terminal 112. The diode 124 blocks charge current and ensures the constant availability of power for discharge. The modular battery system 100 may further include a fuse for short circuit protection. The fuse opens in the event the output is shorted together. The modular battery system 100 may further include a relay 317 which controls the charge current for the battery modules. The master control module 126 communicates via a electrical signal with the relay 317 and controls the relay 317 by opening and closing as necessary. For example, to reduce charge current, the master control module 126 senses the need to reduce charge then closes the relay 317 by-passing the diode 124. The modular battery system 100 may further include at least one thermal switch which provides temperature protection.

Figure 5:
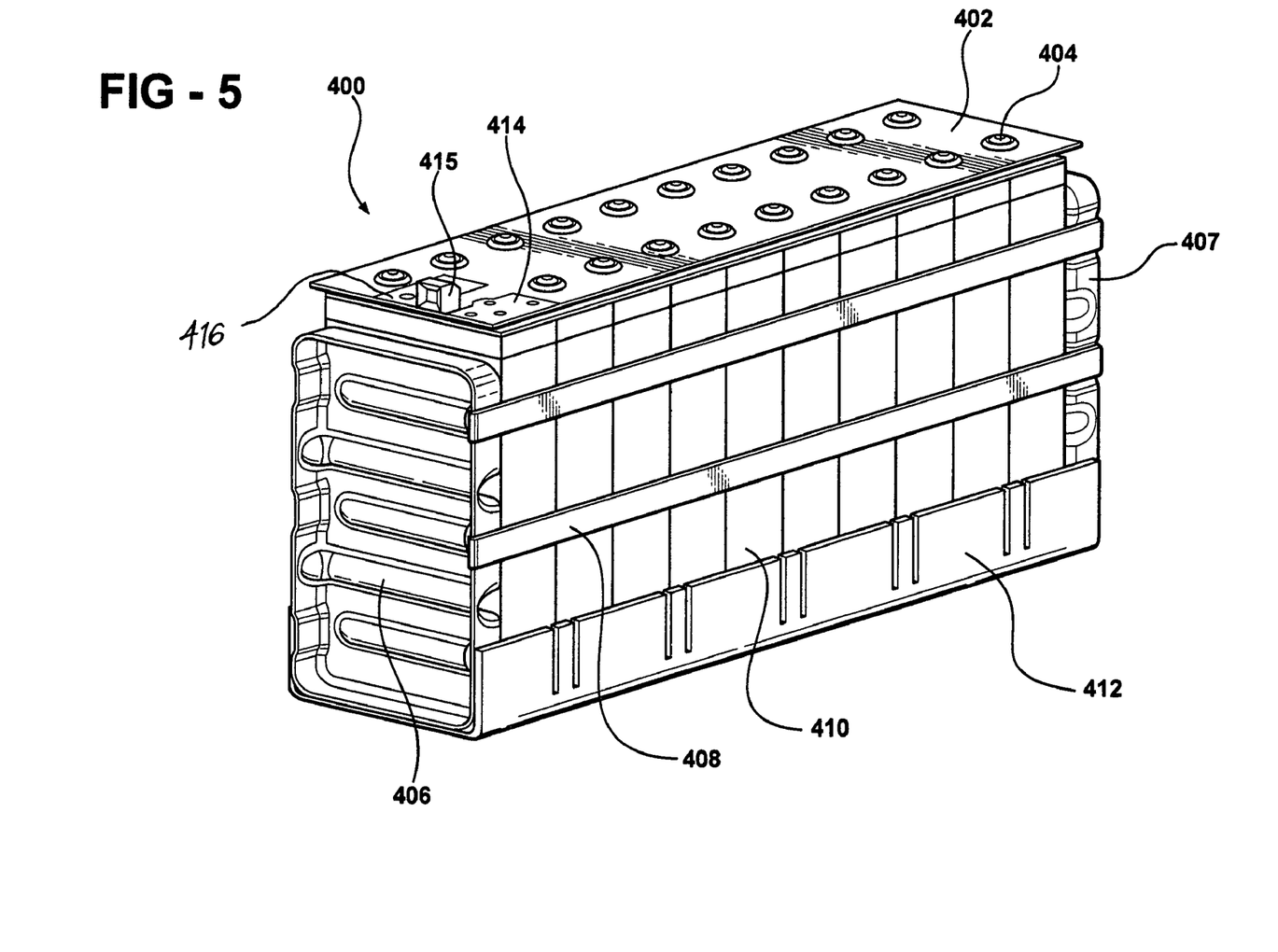
FIG. 5 is a side view illustration of the present invention that shows a preferred embodiment of a battery module that may be used.

Referring to FIG. 5, a subsystem of the present invention, generally referred to as 400, is illustrated. The batteries are bound together under external mechanical compression within a module bundling/compression means such that they are secure and do not move around or dislodge when subjected to the mechanical vibrations of transport or use.

While any number of batteries may be bundled into a module 410, 2-15 batteries per bundle is preferable. The battery modules 410 are preferably bundles of prismatic batteries of the instant invention, although other types of batteries, such as cylindrical or flat wound, may be incorporated. Preferably, the batteries are bundled such that they are all oriented in the same fashion with each battery having its electrical terminals located on top. The batteries are oriented within the module 410 such that their narrowest sides face the sides of the module and their wider sides (those which, on expansion of the batteries, will warp) are placed adjacent to other batteries in the module 410. This arrangement permits expansion in only one direction within the module 410, which is desirable.

The batteries are bound within the module bundling/compression means under external mechanical compression which is optimized to balance outward pressure due to expansion of the battery components and provide additional inward compression on the battery electrodes within each battery to reduce the distance between the positive and negative electrodes, thereby increasing overall battery power.

Another preferred design uses metal end plates 406 and 407 at the ends of the module 410, as illustrated in FIG. 5. The plurality of band members 408 may be positioned along the sides of the battery module 410 and may be welded at the corners of the module 410 to rectangular metal tubing (not shown) which replaces the end bars and holds the end plates 406 and 407 in position. The band members may comprise stainless steel bars. The end plates 406 and 407 are preferably formed from aluminum and may include ribs 405 protruding perpendicular to the plane of the end plates 406 and 407, thereby providing added strength to the plates 406 and 407 and allowing for lighter materials to be used. When the end plates 406 and 407 have such ribbing 405, it is necessary that there are slots (not shown) in the ribbing 405 to accommodate the rectangular metal tubing. The end plates 406 and 407 may preferably be thermally isolated or insulated from the batteries bundled within the module 410 by a thermally insulating material such as a thermally insulating layer of polymer or polymer foam. This insulation prevents uneven battery temperature distribution within the module 410 which may be caused by the cooling fin action of the ribs of the end plates 406 and 407. However, the ribs 405 can provide added thermal dissipation for the batteries within the module 410, if needed, by thermally sinking the end plates 406 and 407 to the adjacent batteries. To secure the subsystems 400 and supporting components and electronics, the end plates 406 and 407 are bolted of otherwise secured to the bottom section of the system housing. For structural stability of the subsystem, a subsystem base 412 may is preferably secured to the base of the modules 412 and the end plates 406 and 407. Further, the subsystem base 412 may be secured, such as bolts or screws, to the system housing bottom of the system housing.

The main positive module contactor 414 is electrically connected to a negative module contactor of an adjoining subsystem via a module bus bar or electrically connected to the positive terminal 112 via the positive terminal bus bar. The main negative module contactor 416 is electrically connected to a positive module contactor of an adjoining subsystem via a module bus bar or electrically connected to the negative terminal 120 via the negative terminal bus bar. The module interconnect 415 transmits the electrical signals from the interconnect plate to the mid interconnect plate, preferably via signal transmission connectors.

The subsystem 400 is preferably in electrical communication with at least one interconnect plate 402, wherein the interconnect plate 402 transmits status information, such as module temperature and module voltage, to the mid interconnect plate as described above. Preferably, each module terminal is in electrical communication with module terminal connectors 404 of the adjoining interconnect plate 402. The module terminal connectors 404 transmit electrical current from the battery modules 410 to the interconnect plate 402, where the electrical current is further transmitted to the positive terminal, as described above.

Each of the modules may additionally include module spacers (not shown) which hold the modules at a distance from any other modules and from a battery pack case. These module spacers are placed on the top and bottom of the module to provide protection to the corners of the batteries within the module and the electrical interconnects and terminals of the batteries. More importantly, tabs on the sides of the spacers hold the modules at the optimal distance apart. The spacers are preferably formed from a light weight, electrically non-conductive material, such as a durable polymer. Also, it is important to the overall pack energy density that the spacers include as little total material as possible to perform their required function and still be as light as possible.

Generally, the positive and negative active materials used in the battery system of the present invention may be any type of active battery materials used in the art. Examples of positive electrode materials are powders of lead oxide, lithium cobalt dioxide, lithium nickel dioxide, lithium iron phosphate, lithium nickel dioxide, lithium manganese oxide compounds, lithium vanadium oxide compounds, lithium iron oxide, lithium compounds, i.e., complex oxides of these compounds and transition metal oxides, manganese dioxide, zinc oxide, nickel oxide, nickel hydroxide, manganese hydroxide, copper oxide, molybdenum oxide, carbon fluoride, etc. Preferably, the positive electrode active material is a nickel hydroxide material.

Examples of negative electrode materials include metallic lithium and like alkali metals, alloys thereof, alkali metal absorbing carbon materials, zinc, cadmium hydroxide, hydrogen absorbing alloys, etc. Preferably, the negative electrode active material is a hydrogen absorbing alloy (also referred to in the art as a hydrogen storage alloy). It is within the spirit and intent of this invention that any hydrogen absorbing alloy can be used. In a preferable embodiment of the present invention, each electrochemical cell is a nickel-metal hydride cell comprising negative electrodes including hydrogen absorbing alloy materials as the active material, and positive electrodes including nickel hydroxide as the active material.

Figure 7:
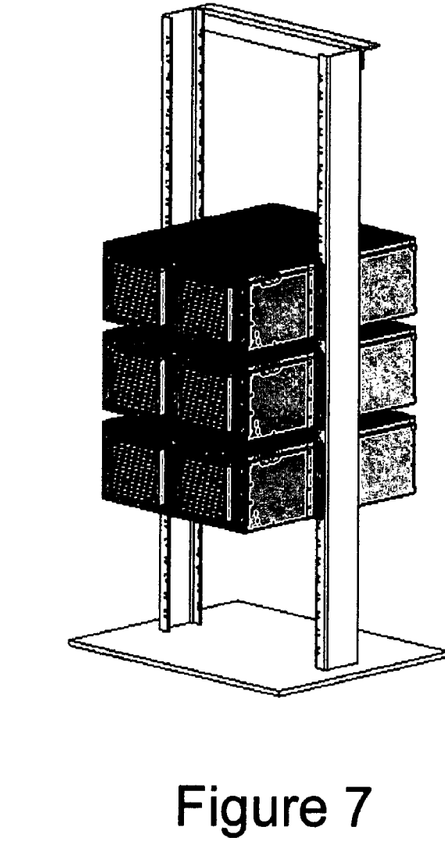
FIG. 7 is a perspective view of an embodiment of the present invention that shows an embodiment of an open relay rack.

A plurality of modular battery systems may be stacked and electrically connected to form a stationary battery system. Referring to FIGS. 6 and 7, exemplary stack designs are illustrated. The status information, such as voltage and temperature, collected by the modular battery systems may be reported to a master data monitoring unit over a Controller Area Network (CAN) bus connected to the master control module of each modular battery system. The modular battery systems may be connected in series or parallel, depending upon the power needs of a given application.

While the invention has been illustrated in detail in the drawings and the foregoing description, the same is to be considered as illustrative and not restrictive in character as the present invention and the concepts herein may be applied to any formable material. It will be apparent to those skilled in the art that variations and modifications of the present invention can be made without departing from the scope or spirit of the invention. For example, the system housing may be adapted to conform to different spaces for a desired application. Thus, it is intended that the present invention cover all such modifications and variations of the invention that come within the scope of the appended claims and their equivalents.

We claim:

1. A modular battery system having at least one subsystem comprising a plurality of battery modules electrically connected, said modular battery system comprising:
    each subsystem having a first endplate and a second endplate, each of said battery modules having at least one terminal and said battery modules bound between said first and second endplates;
    a data collection panel having at least one interconnect plate, each of said interconnect plates in electrical communication with at least one of said subsystems, said interconnect plates transferring electrical current from said battery modules to a positive terminal and from a negative terminal; and
    each interconnect plate having an integrated module terminal connector in electrical communication with each terminal of each of said battery modules, each of said integrated module terminal connectors transmitting status information of said modules to said interconnect plate and each of said integrated module terminal connectors transferring electrical current from said battery modules to said interconnect plate.

2. The modular battery system of claim 1, each of said subsystems secured into a system housing, said system housing comprising a face plate, a back plate, a cover, a bottom, a first side panel and a second side panel and a plurality of band members coupling each of said first and second endplates to each other and binding said battery module between the endplates.

3. The modular battery system of claim 1, said data collection panel further comprising:
    a mid interconnect plate, said interconnect plates transmitting status information of said modules via electrical signals to said mid interconnect plate and said interconnect plates transmitting said electrical signals to said master control module.

4. The modular battery system of claim 3, further comprising at least one temperature sensor, at least one hydrogen sensor, and at least one moisture sensor integrated into each of said interconnect plates, said status information comprising at least battery system temperature, battery system hydrogen level, and battery system moisture level and voltage of each battery module.

5. The modular battery system of claim 4, said data collection panel transmitting said status information to a master control module, said master control module converting said electrical signals to data signals and said master control module controlling charge cycle of said battery modules and collecting said status information.

6. The modular battery system of claim 5, further comprising a controller area network bus communication connector in data communication with said master control module, said controller area network bus communication connector adapted to relay said status information and load software parameters into said master control module.

7. The modular battery system of claim 6, further comprising a diode in electrical communication with said positive terminal, said diode providing power availability for discharge.

8. The modular battery system of claim 6, said system housing further comprising a ground stud electrical grounding of the system housing.

9. The modular battery system of claim 6, further comprising a current sensor, said current sensor detecting current flow into and out of battery and said current sensor in data communication with said master control module.

10. The modular battery system of claim 6, further comprising a fan integrated into said back plate, said fan adapted draw air into contact with subsystems for cooling, said fan actuate by said master control module.

11. The modular battery system of claim 10, further comprising at least one air grate integrated into said face plate, said fan drawing air into said housing through said air grates.

12. The modular battery system of claim 6, further comprising an integral temperature sensor, said integral temperature sensor in data communication with said master control module.

13. The modular battery system of claim 6, further comprising a diode, said diode blocks charge current and ensures the constant availability of power for discharge.

14. The modular battery system of claim 6, further comprising at least one relay in electrical communication with the positive terminal and at least one relay in electrical communication with the negative terminal, each of said relays in data communication with the master control module and said relays controlling charge current of each battery module.

15. The modular battery system of claim 6, further comprising a fuse, said fuse providing short circuit protection.

16. The modular battery system of claim 6, wherein said battery modules are connected in series.

17. The modular battery system of claim 6, wherein said battery modules are connected in parallel.

18. A stationary battery system having a plurality of modular battery systems, each of said modular battery systems comprising:
    at least one subsystem comprising a plurality of battery modules electrically connected, each of said battery modules having at least one terminal:
    each subsystem having a first endplate and a second endplate, said battery modules bound between said first and second endplates and each battery module is in lateral contact with each adjacent module;
    a plurality of band members coupling each of said first and second endplates to each other and binding said battery module between the endplates;
    a data collection panel having at least one interconnect plate, each of said interconnect plates in electrical communication with one of said subsystems, said interconnect plates transferring electrical current from said battery modules to a positive terminal and from a negative terminal; and each interconnect plate having an integrated module terminal connector in electrical communication with each terminal of each of said battery modules, each of said module terminal connectors transmitting status information of said modules to said interconnect plate and each of said module terminal connectors transferring electrical current from said battery modules to said interconnect plate.

19. The stationary battery system of claim 18, said data collection panel further comprising:

a mid interconnect plate, said interconnect plates transmitting status information of said modules via electrical signals to said mid interconnect plate and said interconnect plates transmitting said electrical signals to said master control module.

20. The stationary battery system of claim 19, said data collection panel transmitting said status information to a master control module, said master control module in data communication with said mid interconnect plate, said master control module controlling charge cycle of said battery modules and collecting said status information.

21. The stationary battery system of claim 20, further comprising a controller area network bus communication connector in data communication with said master control module, said controller area network bus communication connector adapted to relay said status information and load software parameters into said master control module.

22. The stationary battery system of claim 18, wherein said modular battery systems are connected in series.

23. The stationary battery system of claim 18, wherein said modular battery systems are connected in parallel.

24. The stationary battery system of claim 18, each of said master control modules in data communication with a master data monitoring unit.

* * * * *